US012621739B2

(12) United States Patent
Goyal et al.

(10) Patent No.: US 12,621,739 B2
(45) Date of Patent: May 5, 2026

(54) SYSTEMS AND METHODS FOR FRONT HAUL TRAFFIC PROCESSING ON RADIO UNITS AND DISTRIBUTED BASEBAND UNITS

(71) Applicant: EdgeQ, Inc., Santa Clara, CA (US)

(72) Inventors: Vivek Goyal, Indore Madhya Pradesh (IN); Gopalakrishnan Perur Krishnan, Bangalore (IN)

(73) Assignee: EdgeQ, Inc., Santa Clara, CA (US)

( * ) Notice: Subject to any disclaimer, the term of this patent is extended or adjusted under 35 U.S.C. 154(b) by 221 days.

(21) Appl. No.: 18/119,935

(22) Filed: Mar. 10, 2023

(65) Prior Publication Data

US 2023/0217342 A1 Jul. 6, 2023

Related U.S. Application Data

(62) Division of application No. 17/467,211, filed on Sep. 4, 2021, now Pat. No. 11,653,283.

(51) Int. Cl.
| | |
|---|---|
| *H04W 40/02* | (2009.01) |
| *H04W 56/00* | (2009.01) |
| *H04W 88/10* | (2009.01) |

(52) U.S. Cl.
CPC ......... *H04W 40/02* (2013.01); *H04W 56/002* (2013.01); *H04W 88/10* (2013.01)

(58) Field of Classification Search
CPC ........................... H04W 56/002; H04W 40/02
See application file for complete search history.

(56) References Cited

U.S. PATENT DOCUMENTS

| | | | | |
|---|---|---|---|---|
| 2009/0282419 A1* | 11/2009 | Mejdrich | ................ | H04L 47/10 |
| | | | | 719/314 |
| 2013/0159668 A1* | 6/2013 | Muff | ................... | G06F 15/8053 |
| | | | | 712/7 |

(Continued)

FOREIGN PATENT DOCUMENTS

WO 2021158963 A1 8/2021

OTHER PUBLICATIONS

International search report and written opinion of the international searching authority mailed Mar. 6, 2023 and received Mar. 15, 2023 in related PCT application No. PCT/US22/42450, (12 pgs).

*Primary Examiner* — Wutchung Chu
*Assistant Examiner* — Berhanu D Belete
(74) *Attorney, Agent, or Firm* — Michael North

(57) ABSTRACT

Enhanced Common Packet Radio Interface (eCPRI) based Fronthaul forms the foundation for open radio access network (O-RAN). O-RAN envisages splitting the radio into two parts, a Distributed Unit (DU) and Radio Units (RU), interconnected using high speed Fronthaul links. O-RAN and eCPRI for 5G/NR place demands for high speed Fronthaul with low latency, and high network bandwidth requirements. In the present disclosure, embodiments for configurable eCPRI Fronthaul solutions are disclosed. Various hardware accelerator implementations are presented for control plane and user plane traffic. The hardware accelerator implementation may support DU and RRU functionality required by eCPRI with minimal software intervention. The configurable eCPRI Fronthaul may support different data flows and meet different performance demands of DU and RRU. Scalable architecture may be applied for the configurable eCPRI Fronthaul to allow stacking of multiple hardware accelerators via a high-speed network interconnect, and overall performance and throughput may be improved.

16 Claims, 5 Drawing Sheets

(56)                    References Cited

U.S. PATENT DOCUMENTS

| | | | | |
|---|---|---|---|---|
| 2013/0331954 | A1* | 12/2013 | McConnell | G05B 19/02 |
| | | | | 700/2 |
| 2014/0040909 | A1* | 2/2014 | Winser | G06F 9/50 |
| | | | | 718/104 |
| 2014/0115195 | A1* | 4/2014 | Higham | G06F 13/28 |
| | | | | 710/22 |
| 2015/0143073 | A1* | 5/2015 | Winser | G06F 9/3877 |
| | | | | 712/3 |
| 2016/0004655 | A1* | 1/2016 | Yoo | G06F 12/1081 |
| | | | | 710/308 |
| 2019/0045421 | A1* | 2/2019 | Shah | H04W 40/02 |
| 2019/0138493 | A1* | 5/2019 | Teh | G06F 13/1673 |
| 2019/0254047 | A1* | 8/2019 | Ahmed | H04W 74/0816 |
| 2019/0266088 | A1* | 8/2019 | Kumar | G06F 15/7825 |
| 2019/0289497 | A1* | 9/2019 | Rajagopal | H04B 7/0456 |
| 2019/0387471 | A1* | 12/2019 | Salmela | H04W 52/0229 |
| 2020/0221299 | A1* | 7/2020 | Suthar | H04W 60/00 |
| 2020/0236592 | A1* | 7/2020 | Berg | H04W 88/085 |
| 2020/0296696 | A1* | 9/2020 | Goldhamer | H04W 4/40 |
| 2021/0103536 | A1* | 4/2021 | Galles | G06F 9/30079 |
| 2021/0120104 | A1* | 4/2021 | Al-Mufti | H04L 41/0806 |
| 2021/0120527 | A1* | 4/2021 | Rhim | H04L 27/2602 |
| 2021/0120531 | A1* | 4/2021 | Jeon | H04B 7/0691 |
| 2021/0126760 | A1* | 4/2021 | Lee | H04B 7/0617 |
| 2021/0176823 | A1* | 6/2021 | Mishra | H04W 24/02 |
| 2021/0218608 | A1* | 7/2021 | Rama Chandran | |
| | | | | H04L 27/2607 |
| 2021/0243840 | A1* | 8/2021 | Raghothaman | H04L 5/0044 |
| 2021/0250773 | A1* | 8/2021 | Bhaskaran | H04W 72/1215 |
| 2021/0273747 | A1* | 9/2021 | MacKenzie | H04L 1/0078 |
| 2021/0385169 | A1* | 12/2021 | Urman | H04L 1/08 |
| 2022/0021621 | A1* | 1/2022 | Hariharan | H04W 88/085 |
| 2022/0030662 | A1* | 1/2022 | Mueck | H04W 76/50 |
| 2022/0053472 | A1* | 2/2022 | Jeon | H04B 7/06968 |
| 2022/0078631 | A1* | 3/2022 | Salahuddeen | H04L 45/16 |
| 2022/0078643 | A1* | 3/2022 | Vierimaa | H04B 17/17 |
| 2022/0086890 | A1* | 3/2022 | Kim | H04W 72/23 |
| 2022/0210808 | A1* | 6/2022 | Rama Chandran | H04L 69/22 |
| 2022/0338164 | A1* | 10/2022 | Simon | H04W 4/06 |
| 2022/0361041 | A1* | 11/2022 | Noriega | H04W 28/0812 |
| 2023/0035096 | A1* | 2/2023 | Gangadharan | H04W 88/06 |
| 2023/0209549 | A1* | 6/2023 | Amuru | H04L 5/0044 |
| | | | | 370/329 |
| 2024/0187061 | A1* | 6/2024 | Huang | H04B 7/0617 |

* cited by examiner

_100_

200

<u>400</u>

500

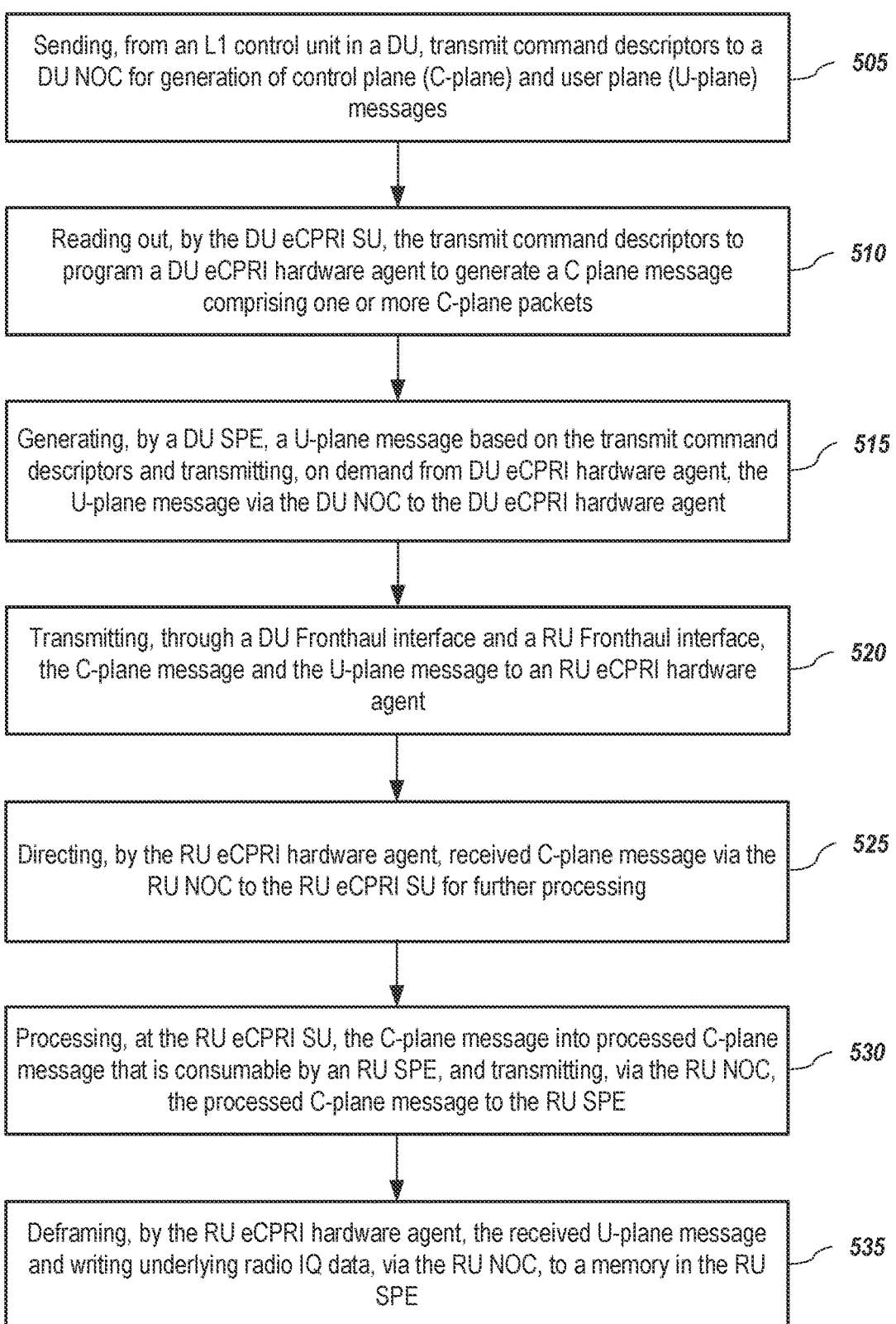

Sending, from an L1 control unit in a DU, transmit command descriptors to a DU NOC for generation of control plane (C-plane) and user plane (U-plane) messages — 505

Reading out, by the DU eCPRI SU, the transmit command descriptors to program a DU eCPRI hardware agent to generate a C plane message comprising one or more C-plane packets — 510

Generating, by a DU SPE, a U-plane message based on the transmit command descriptors and transmitting, on demand from DU eCPRI hardware agent, the U-plane message via the DU NOC to the DU eCPRI hardware agent — 515

Transmitting, through a DU Fronthaul interface and a RU Fronthaul interface, the C-plane message and the U-plane message to an RU eCPRI hardware agent — 520

Directing, by the RU eCPRI hardware agent, received C-plane message via the RU NOC to the RU eCPRI SU for further processing — 525

Processing, at the RU eCPRI SU, the C-plane message into processed C-plane message that is consumable by an RU SPE, and transmitting, via the RU NOC, the processed C-plane message to the RU SPE — 530

Deframing, by the RU eCPRI hardware agent, the received U-plane message and writing underlying radio IQ data, via the RU NOC, to a memory in the RU SPE — 535

FIG. 5

SYSTEMS AND METHODS FOR FRONT HAUL TRAFFIC PROCESSING ON RADIO UNITS AND DISTRIBUTED BASEBAND UNITS

CROSS REFERENCE TO RELATED PATENT APPLICATIONS

This application is a divisional application of U.S. patent application Ser. No. 17/467,211, entitled "SYSTEMS AND METHODS FOR FRONT HAUL TRAFFIC PROCESSING ON RADIO UNITS AND DISTRIBUTED BASEBAND UNITS", naming inventors as Vivek Goyal and Gopalakrishnan Perur Krishnan, and filed on Sep. 4, 2021, which application is hereby incorporated herein by reference in its entirety.

TECHNICAL FIELD

The present disclosure relates generally to systems and methods for front haul traffic processing. More particularly, the present disclosure relates to systems and methods to reduce area and latency for front haul traffic processing on radio units and distributed baseband units.

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc. Different wireless standards have aspects which are very different from each other—fundamental frame structures, timing of symbols, forward error correction (FEC) codes, data rates, tolerance to delays.

Enhanced Common Packet Radio Interface (eCPRI) based Fronthaul forms the foundation for next generation Radio Access Network (RAN) technologies, including open radio access network (O-RAN). O-RAN envisages splitting the radio into two parts, a Distributed Unit (DU) and Remote Radio Units (RRU or RU), interconnected using high speed Fronthaul links.

O-RAN and eCPRI for 5G/NR place demands for high speed Fronthaul with low latency, and high network bandwidth requirements. The eCPRI packet encapsulation and decapsulation on DU and RU require hardware acceleration to meet the high performance and low latency demands.

Accordingly, what is needed are systems, devices and methods that meet the above-described requirements for high speed Fronthaul with low latency, and high network bandwidth.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 5 depicts a process for eCPRI communication between a DU and an RU, according to embodiments of the present disclosure.

DETAILED DESCRIPTION OF EMBODIMENTS

Figure 1:
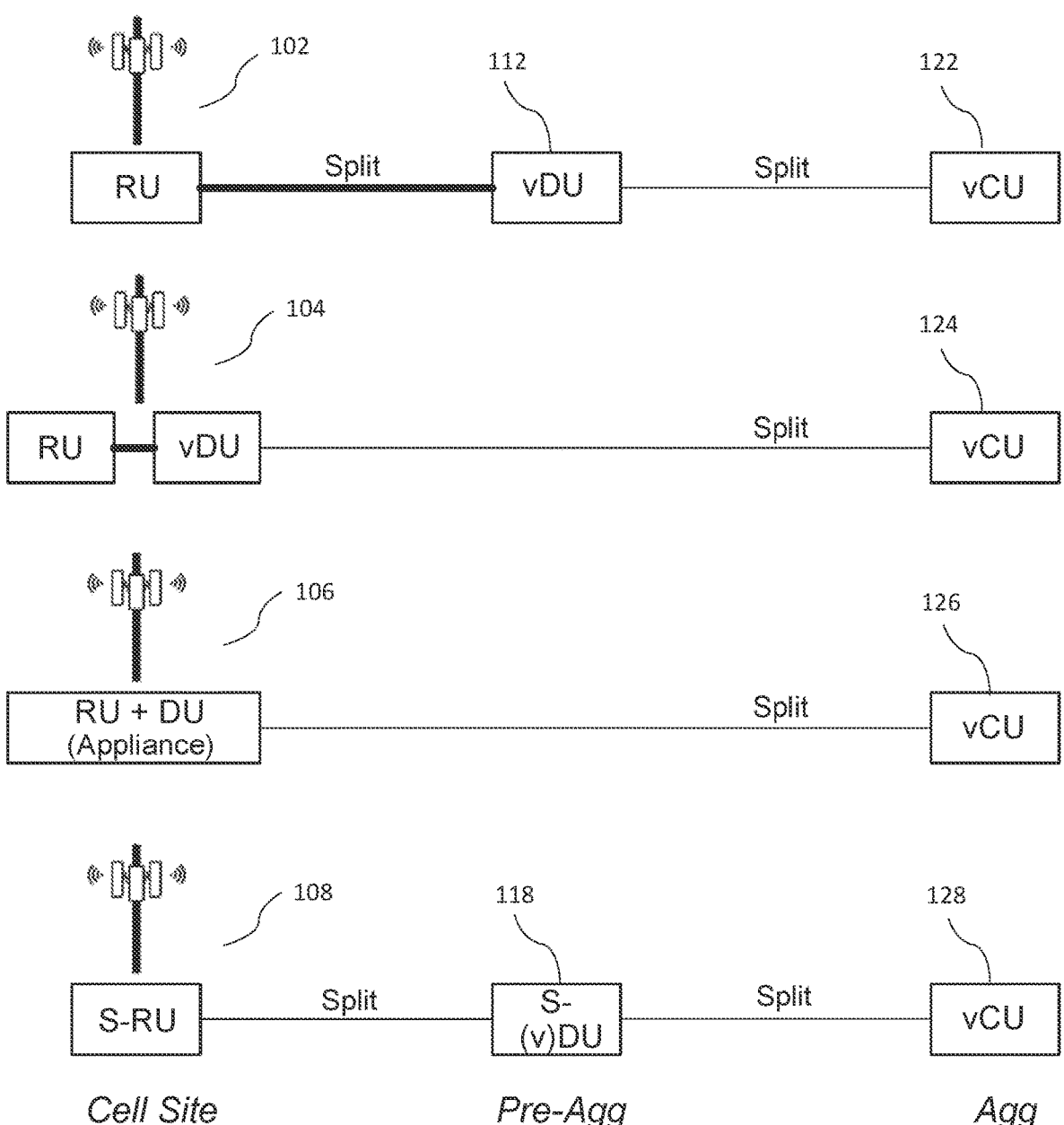
FIG. 1 ("FIG. 1") depicts various open radio access network (RAN) deployments for a telecommunication service provider, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a RAT to provide connection between a device, e.g., a mobile phone, and a core network (CN). Open RAN is an approach based on interoperability and standardization of RAN elements including a unified interconnection standard for white-box hardware and open source software elements from different vendors.

FIG. 1 depicts various O-RAN deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a distribution unit (DU) and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, Fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), Operational preference, etc. It is desirable for SPs to achieve maximum consistency around architecture, systems and operational model across all these deployment models.

Described in the following sections are embodiments for a robust, high performance hardware accelerator, which may be architected and implemented to meet differing data flows and performance expectations of DU and RU. The hardware implementation may be configurable and scalable, and may allow stacking of multiple hardware agents through a high-speed network interconnection. The hardware accelerator may support a rich feature set to handle evolving O-RAN and eCPRI requirements.

B. Embodiments for Configurable eCPRI Fronthaul

In this section, embodiments for configurable eCPRI Fronthaul are disclosed. Embodiments of hardware accelerator implementation are presented for control plane (also referred to as C plane) and User plane (also referred to as U plane) traffic. The hardware accelerator implementation may support DU as well as RRU functionality required by eCPRI with minimal software intervention. The configurable eCPRI Fronthaul may support different data flows and meet different performance demands of DU and RRU. Scalable architecture may be applied for the configurable eCPRI Fronthaul to allow stacking of multiple hardware accelerators via a high-speed network interconnect, and overall performance and throughput may be improved.

In one or more embodiments, the configurable eCPRI Fronthaul may support Massive MIMO and Beamforming messaging at a high speed, e.g., up to 50 Gbps using 4 hardware agents. Furthermore, the configurable eCPRI Fronthaul may support Layer2 and Layer3 encapsulation of eCPRI messages, multiple carriers per DU, and multiple streams or extended Antenna-Carriers (eAxCs) (e.g., up to 64 streams/eAxCs using 4 hardware agents) with flexibility to increase additionally for future requirements. The configurable eCPRI Fronthaul may be architected to handoff Sync & Management Plane traffic processing, and other low bandwidth flows to software for scalability.

Figure 2:
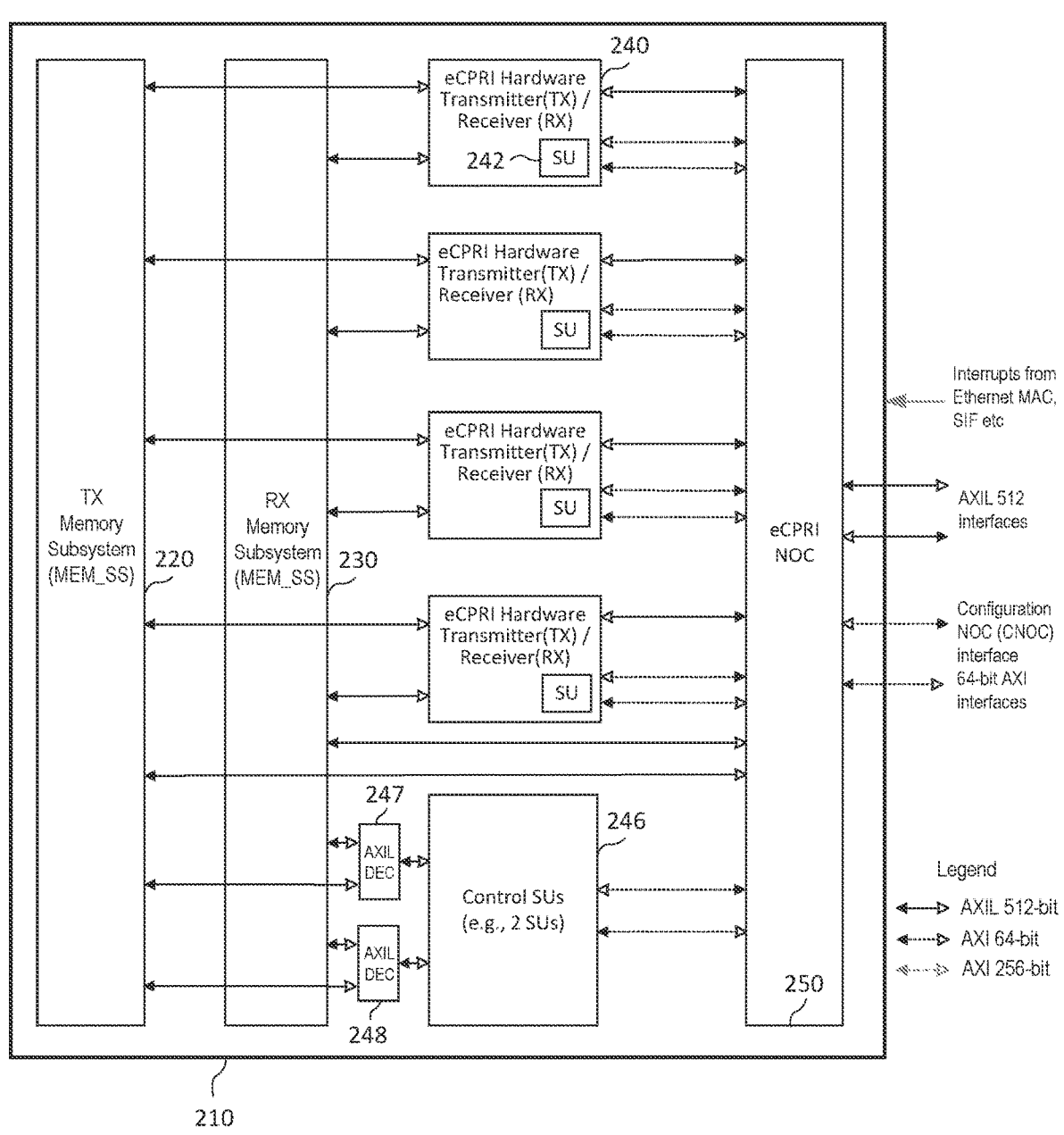
FIG. 2 depicts a block diagram of a device for eCPRI based Fronthaul communication, according to embodiments of the present disclosure.

FIG. 2 depicts a block diagram of a device for eCPRI based Fronthaul communication, according to embodiments of the present disclosure. The device 210 may be a device for Fronthaul communication, e.g., a DU or an RU. The device 210 comprises multiple hardware agents 240, a memory subsystem (MEM_SS) for data transmitting (TX) 220, a MEM_SS for data receiving (RX) 230, a control scalar unit (SU) block 246, and an eCPRI network-on-chip (NOC) circuit 250. Each hardware agent may comprise an internal SU 242, e.g., a general-purpose processor or a processing core, for operation control. In one or more embodiments, a hardware agent may be an eCPRI hardware agent configured for data processing in a transmitting path, a receiving path, or a combination thereof. Furthermore, each hardware agent, among the multiple hardware agents, may be configured to specifically handle data processing operation for a corresponding frequency band, one carrier, or one radio access technology (RAT). The hardware agents are stacked to increase performance and throughout capability of the device. As shown in FIG. 2, with 4 hardware agents stacked, 50 Gbps throughput in data transmitting and receiving directions may be reached. Additional performance may be achieved in the same configuration based on choice of manufacturing technology node. Additionally, with more hardware agents stacked and interconnected via a high-speed interconnection, the performance and throughput may be improved further.

The eCPRI NOC circuit 250 operates as a high-speed network interconnection that allows seamless movement of data among the multiple hardware agents, and other processing blocks, such as Ethernet MACs, or wireless Layer1 processing blocks. The eCPRI NOC circuit 250 may support various network protocols in different bit depths, e.g., advanced extensible interface (AXI) protocol in 256-bit or 64-bit, AXI-Lite (AXIL) protocol in 512-bit, etc. The data widths specified here are representational and may be altered for improving performance & throughput, or reducing area of realized logic, or for reducing power consumption. The eCPRI NOC circuit 250 may be configured via a Config NOC (CNOC) interface for desirable operation setting or parameter configuration.

The control scalar unit (SU) block 246 may comprise multiple SUs (e.g., twin SUs as shown in FIG. 2) for delineating receiving data flows transferred from the eCPRI NOC circuit 250, via a corresponding data decoder block (e.g., AXIL DEC 247 or 248 as shown in FIG. 2) for each SU, into designated hardware agents for data processing. The eCPRI transmitting data flows may be handled by the internal SUs within each hardware agent directly and may be transmitted from the MEM_SS for data transmitting (TX) 220.

In one or more embodiments, communications between SUs (internal to the hardware agents or within the control SU block) and the eCPRI NOC circuit 250 may use AXI 64-bit protocol for control interactions, while communication between other components (e.g., between hardware agents and the memory subsystems, between hardware agents and the eCPRI NOC circuit 250) may use AXIL 64-bit protocol. The SUs may be a processor or a processor core based on various architectures, such as ARM, ARC (Argonaut RISC Core), Tensilica, etc. Although FIG. 2 shows one SU in each hardware agent and two SUs in the control SU blocks, one skilled in the art may understand that other variations of SU layout may also be applicable for devices in eCPRI based Fronthaul communication.

Figure 3:
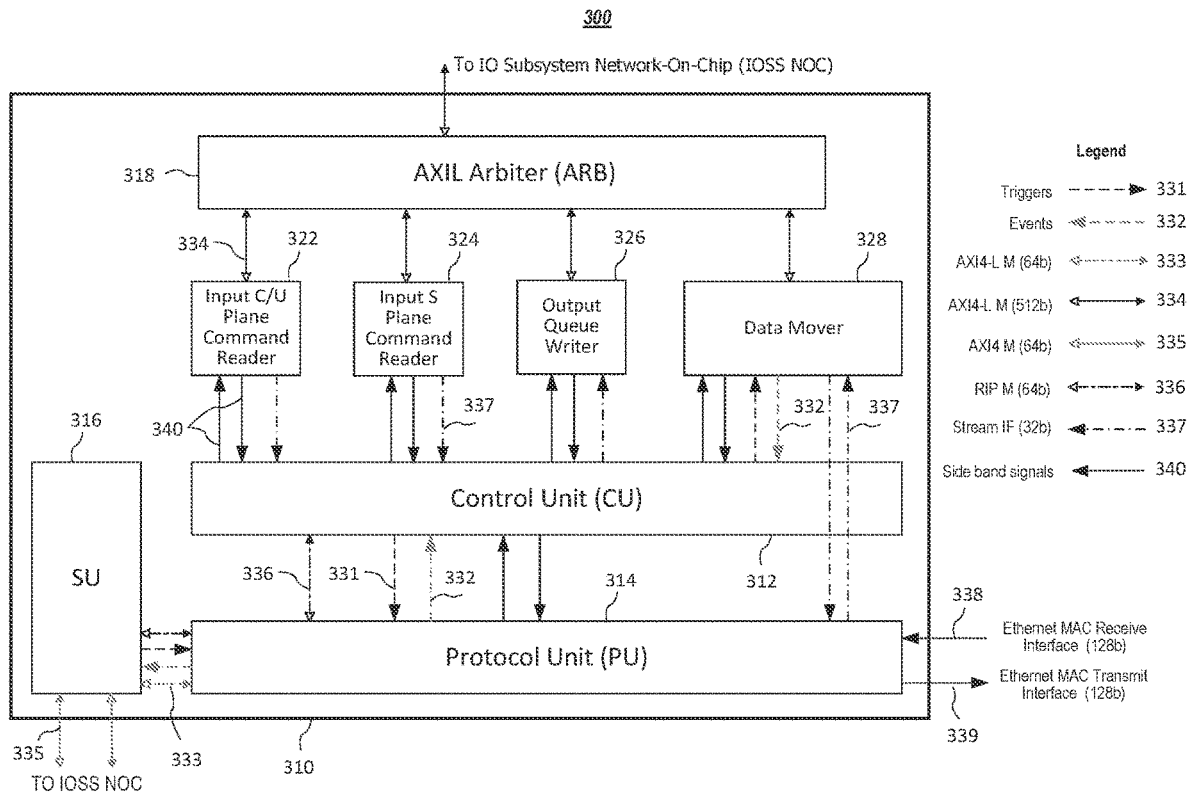
FIG. 3 depicts a block diagram for a hardware agent, according to embodiments of the present disclosure.

FIG. 3 depicts a block diagram for a hardware agent, according to embodiments of the present disclosure. The hardware agent 310 comprises an internal control unit (CU) 312, a protocol unit (PU) 314, an internal SU 316, and multiple Direct Memory Access (DMA) engines for various memory access operations. The multiple DMA engines may comprise an input control/user plane (C/U Plane) command DMA reader 322, an input synchronization plane (S Plane) command DMA reader 324, an output queue writer 326, and a data mover 328. The delineation of the DMA engines allows for better throughput and performance. However, alternate embodiments such as employing a Multi-Channel DMA are also possible. In a multi-channel DMA, each channel can be independently configured to support different data planes (Control/User/Sync etc). In one or more embodiments, the multiple DMA engines communicates with the eCPRI NOC and the memory subsystems (e.g., 220 and 230 as shown in FIG. 2) via an interface 318 that supports various communication, via an advanced extensible interface 4 lite (AXI4-L) 512-bit protocol, related to data, control, and address information. The interface 318 may be an Advanced Microcontroller Bus Architecture (AMBA) AXIL or AMBA AXI4 Bus (AMBA AXI). The internal SU 316 may communicate externally, via an advanced extensible interface 4 (AXI4) 64-bit protocol 335, with the eCPRI NOC for various control or configuration communications.

The PU 314 couples to the internal SU 316 and the control unit 312 for protocol-related communication. In one or more embodiments, the PU 314 may store information, e.g., coding format, data structure, preamble format, etc., corresponding to various protocols. Such information may be preloaded or dynamically loaded (or updated) externally via an Ethernet MAC Receive Interface 338, which may be a 128-bit link. In some embodiments, this interface may be encapsulated via a standard AXI or AXI-L interface. The PU 314 may also couple to the data mover 328 via a bidirectional link 337, which may use a simpler Stream IF protocol (e.g., AXI-4 Stream protocol) in 32-bits. In some embodiments, the Stream IF may be encapsulated as an AXI4 Stream Interface.

Different protocols may be used for communication between different units or blocks in the hardware agent. Those protocols may comprise an AXI4-L 64-bit protocol 333, an AXI4-L 512-bit protocol 334, an AXI4 64-bit protocol 335, a RIP 64-bit protocol 336, a Stream IF 32-bits protocol 337, an Ethernet MAC Receive Interface 338, and an Ethernet MAC Transmit Interface 339, etc. For example, communications between the interface 318 and DMA engines use an AXI4-L 512-bit protocol 334. Furthermore, the CU 312 may communicate with the DMA engines (e.g., 322, 324, 326, and 328) and the PU 314 via side band signals 340. Side band signals may be employed to carry non-standardized information which are not formally defined in the AXI4 or AXI-L or AXI-Stream protocols, but are permitted for extensibility purposes using AxUSER/AwUSER signals.

Figure 4:
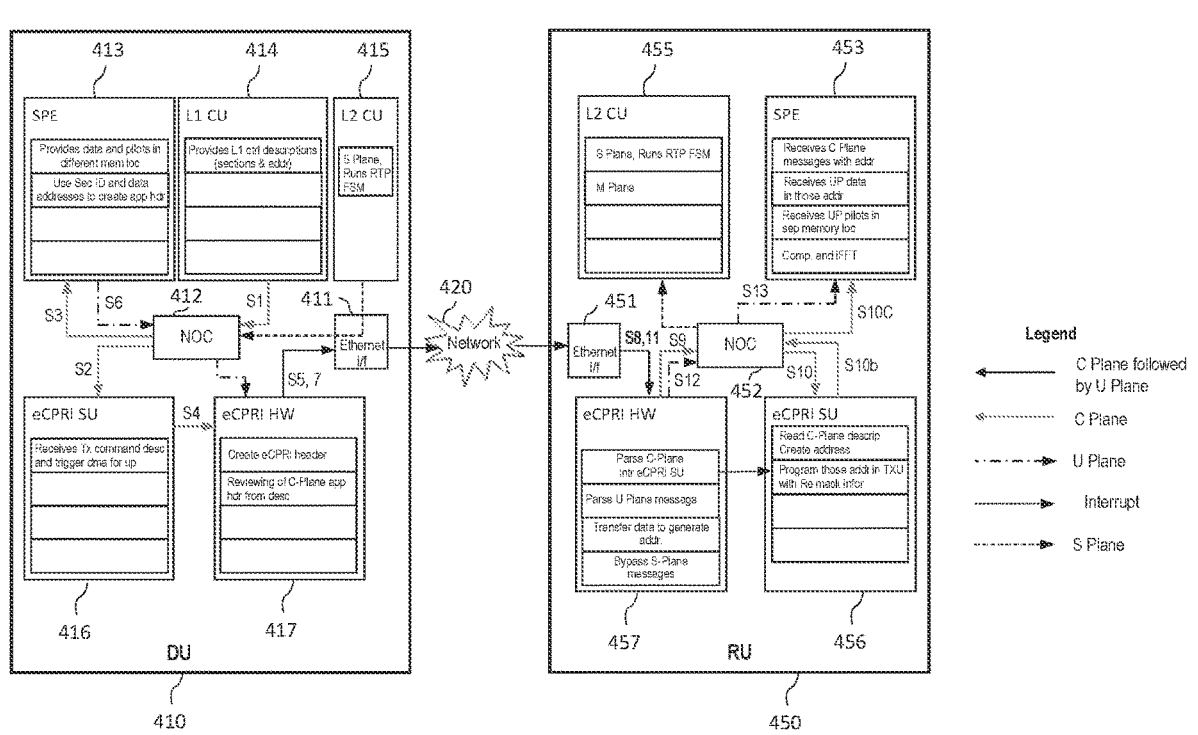
FIG. 4 depicts a block diagram for eCPRI communication between a DU and an RU, according to embodiments of the present disclosure.

FIG. 4 and FIG. 5 respectively depict a block diagram and a process for eCPRI communication between a DU 410 and an RU 450, according to embodiments of the present disclosure. The DU 410 comprises a DU Fronthaul interface 411, a DU NOC 412, a DU signal processing engine (SPE) 413, a first layer (L1) control unit 414, a layer 2 (L2) control unit 415, a DU eCPRI SU 416, and a DU eCPRI hardware agent 417. The RU 510 comprises an RU Ethernet interface 451, an RU NOC 452, an RU SPE 453, an RU L2 control unit 455, an RU eCPRI SU 456, and an RU eCPRI hardware agent 457. The RU and the DU communicate with each other via a network 420, such as an Ethernet network. In one or more embodiments, the DU SPE 413 and the RU SPE 453 may be a transmitter unit (TXU).

The DU SPE 413 provides digitized wireless data and digitized pilot data in different memory locations and uses eCPRI section ID and data addresses to create eCPRI application header. The L1 control unit 414 in the DU may be a wireless layer-1 control unit to provide L1 control descriptions, e.g., sections and address information, etc. The L2 control unit 414 in the DU may be a wireless layer-2 control unit, e.g., a CPU sub-system, which handles wireless Layer-2 functions. The DU eCPRI hardware agent 417 in the DU 410 may perform functions comprising creating eCPRI header for C-plane & U-plane traffic which are routed towards the RU by processing descriptor based information provided by the L1 control unit. The DU eCPRI hardware agent 417 in the DU 410 may also perform functions comprising parsing U-plane messages in the return direction for packets received from the RU. The eCPRI hardware agent 457 in the RU 450 may perform functions comprising parsing C-plane and U-plane messages, transferring data to generate address information, and bypassing synchronization plane (S-plane) messages, etc. The RU eCPRI SU 456 may perform functions comprising reading C-plane descriptor and creating addresses, programming those addresses in the RU SPE 453, etc. Although FIG. 4 shows one eCPRI hardware agent for RU and one eCPRI hardware agent for DU for illustration, one skilled in the art may understand multiple eCPRI hardware agents may be stacked in the RU and/or DU, as shown in FIG. 2, to improve overall performance and throughput.

In one or more embodiments, the L2 CU 415 in the DU and the L2 CU 455 in the RU are configured for processing messages in S-plane and running real-time transport protocol (RTP) finite state machine (FSM). S-plane is responsible for the timing and synchronization between the DU 410 and the RU 450. In certain deployments (e.g., Cloud RAN), a highly accurate synchronization may be required between DUs and RUs to achieve controlled linking for certain synchronization operations, e.g., Time division duplex (TDD) communication, Carrier Aggregation using multiple O-RUs, MIMO, beamforming, etc. Using S-Plane, the Fronthaul communication may support protocols, such as Precision Timing Protocol (PTP) or Synchronous Ethernet (SyncE), to achieve high-accuracy synchronization between the RU and the DU.

In one or more embodiments, the L2 CU 455 in the RU may be configured for receiving and processing messages in management plane (M-plane) for RU management. M-plane provides various RU management functions to set one or more parameters on the RU 450 as required by the C/U-plane and S-plane. The Fronthaul communication on M-Plane may provide various parameters to implement FCAPS (fault-management, configuration, accounting, performance, and security) functions. Accordingly, such an M-Plane communication may support a multi-vendor Open RAN and thus enhance the compatibility for system operation.

Referring now to FIG. 5, in step 505 (as shown in S1 in FIG. 4), the L1 control unit 414 sends out transmit (TX) command descriptors to the DU NOC 412 for generation of control plane (C-plane) and user plane (U-plane) messages. These TX command descriptors may be stored in local memories such as TX_MEM_SS 220 in FIG. 2. In alternate embodiments, these TX command descriptors may be stored in other local memories which are accessible via the NOC 412.

In step 510 (as shown in S2 and S4 in FIG. 4), the DU eCPRI SU 416 reads out the transmit command descriptors to program the DU eCPRI hardware agent 417 to generate a C plane message comprising one or more C-plane packets.

In step 515 (as shown in S3 and S6 in FIG. 4, which may be implemented in parallel to S2), the DU SPE gets the transmit command descriptors to generate a U-plane message and transmits, on demand from DU eCPRI hardware agent 417, the U-plane message via the DU NOC 412 to the DU eCPRI hardware agent 417. In an alternate embodiment, the DU SPE may store the U-plane message in its local memory, and the DU eCPRI hardware agent 417 may have direct media access to this message via the DU NOC 412, and process the message. In a yet another alternate embodiment, the DU SPE may store the U-plane message in the TX_MEM_SS, and the DU eCPRI hardware agent 417 may carry out a local DMA from the TX_MEM_SS for processing this U-plane message.

In step 520 (as shown in S5, S7, S8 and S11 in FIG. 4), the C-plane message and the U-plane message are transmitted, through the DU Fronthaul interface 411 and the RU Fronthaul interfaces 451, to the RU eCPRI hardware agent 457. The Fronthaul interface may comprise an Ethernet MAC, PCS, and high speed Serdes for carrying eCPRI packets overlaid on top of Ethernet packets.

In step 525 (as shown in S9 and S10 in FIG. 4), the RU eCPRI hardware agent 457 directs, via the RU NOC 452, received C-plane message to the RU eCPRI SU 456 for further processing.

In step 530 (as shown in S10*b* and S10C in FIG. 4), the RU eCPRI SU 456 processes the C-plane message into processed C-plane message that is consumable by the RU SPE 453, and transmits, via the RU NOC 452, the processed C-plane message to the RU SPE 453.

In step 535 (as shown in S12 and S13 in FIG. 4), the RU eCPRI hardware agent 457 deframes the received U-plane message and writes underlying radio IQ data, via the RU NOC 452, to a memory in the RU SPE 453. In one or more embodiments, memory offset for the underlying IQ data to be written to is calculated using section & sequence information provided in the received U-plane message. In an alternate embodiment, the memory offset may be derived using descriptors that are provided by the RU SPE 453.

While embodiments of the DU-to-RU flow are described in FIG. 4 and FIG. 5, one skilled in the art shall understand that U-plane packets sent from the RU to the DU may follow a similar flow. Accordingly, steps regarding U-plane packets flow shown in FIG. 4 may also be applicable, after direction reversed for those steps, to RU-to-DU flow.

For the processes shown in FIG. 5, one skilled in the art shall recognize that: (1) certain steps may optionally be performed; (2) steps may not be limited to the specific order set forth herein; (3) certain steps may be performed in different orders; and (4) certain steps may be done concurrently.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A device for Fronthaul communication comprising:
an enhanced common packet radio interface (eCPRI) network-on-chip (NOC) circuit as a network interconnection interface for data flows receiving and transmitting;
a memory subsystem for data transmitting;
a memory subsystem for data receiving;
multiple eCPRI hardware agents coupled to the memory subsystem for data transmitting and the memory subsystem for data receiving for data processing in a transmitting path and in a receiving path respectively, each eCPRI hardware agent comprises an internal SU for operation control, an internal control unit (CU), a protocol unit (PU), and one or more direct memory access (DMA) engines for memory access operations; and
a control scalar unit (SU) block that delineates received data flows, transferred from the eCPRI NOC circuit, to the memory subsystem for data receiving for data processing among the multiple eCPRI hardware agents; and
wherein the device is a distributed unit (DU) or a radio unit (RU).

2. The device of claim 1, wherein each eCPRI hardware agent is configured to handle data processing for one corresponding frequency band, one carrier, or one radio access technology (RAT).

3. The device of claim 1, wherein the control SU block comprises multiple SUs, the control SU block delineates receiving data flows using a data decoder block corresponding for each of the multiple SUs within the control SU block.

4. The device of claim 1, wherein the eCPRI NOC circuit couples to the multiple eCPRI hardware agents for data movement among the multiple hardware agents via the eCPRI NOC circuit.

5. The device of claim 1, wherein the one or more DMA engines comprise an input control/user plane (C/U Plane) command DMA reader, an input synchronization plane (S Plane) command DMA reader, an output queue writer, and a data mover.

6. The device of claim 1, wherein the one or more DMA engines comprise a multi-channel DMA engine with each channel independently configured to support different data planes.

7. The device of claim 1, wherein the internal SU in each eCPRI hardware agent handles eCPRI transmitting data flows directly.

8. The device of claim 1, wherein the CU further communicates with the one or more DMA engines and the PU via side-band signals that are employed to carry nonstandardized information, which is not formally defined in one or more communication protocols but permitted for extensibility purposes.

9. A method for Fronthaul communication comprising:
receiving, via an enhanced common packet radio interface (eCPRI) network-on-chip (NOC) circuit in a communication device, data flows in a receiving path, the communication device is a distributed unit (DU) or a radio unit (RU);
delineating, at a control scalar unit (SU) block in the communication device, the received data flows transferred from the eCPRI NOC circuit to a memory subsystem for data receiving; and
processing, among multiple eCPRI hardware agents in the communication device, the delineated data flows for data processing, each eCPRI hardware agent comprises an internal SU for operation control, an internal control unit (CU), a protocol unit (PU), and one or more direct memory access (DMA) engines for memory access operations.

10. The method of claim 9, wherein each eCPRI hardware agent is configured to handle data processing for one corresponding frequency band, one carrier, or one radio access technology (RAT).

11. The method of claim 9, wherein the control SU block comprises multiple SUS, the control SU block delineates the received data flows using a data decoder block corresponding for each of the multiple SUs within the control SU block.

12. The method of claim 9 further comprising:
implementing data movement among the multiple hardware agents via the eCPRI NOC circuit.

13. The method of claim 9, wherein the one or more DMA engines comprise an input control/user plane (C/U Plane) command DMA reader, an input synchronization plane (S Plane) command DMA reader, an output queue writer, and a data mover.

14. The method of claim 9, wherein the one or more DMA engines comprise a multi-channel DMA engine with each channel independently configured to support different data planes.

15. The method of claim 9 further comprising:
handling, using the internal SU in each eCPRI hardware agent, eCPRI transmitting data flows that are transmitted from a memory subsystem for data transmitting.

16. The method of claim 9, wherein the internal SU is a general-purpose processor or processing core.

* * * * *